(12) United States Patent
Schaal et al.

(10) Patent No.: US 6,648,194 B2
(45) Date of Patent: Nov. 18, 2003

(54) HOLDER FOR A DRINKS CONTAINER

(75) Inventors: Falk Schaal, Alpirsbach (DE);
Wolf-Dieter Benz, Schopfloch (DE);
Christian Hehr, Altensteig (DE)

(73) Assignee: fischerwerke Artur Fischer GmbH & Co. KG, Waldachtal (DE)

( * ) Notice: Subject to any disclaimer, the term of this patent is extended or adjusted under 35 U.S.C. 154(b) by 73 days.

(21) Appl. No.: 09/959,142

(22) PCT Filed: Mar. 14, 2001

(86) PCT No.: PCT/EP01/02847
§ 371 (c)(1),
(2), (4) Date: Oct. 17, 2001

(87) PCT Pub. No.: WO01/74621
PCT Pub. Date: Oct. 11, 2001

(65) Prior Publication Data
US 2002/0158174 A1 Oct. 31, 2002

(30) Foreign Application Priority Data
Apr. 1, 2000 (DE) .......................... 100 16 463

(51) Int. Cl.$^7$ ................................. B60R 7/06
(52) U.S. Cl. ................... 224/483; 224/281; 224/282; 224/926; 248/311.2; 296/37.8; 296/37.9; 296/37.12; 297/188.17
(58) Field of Search ................... 224/483, 281, 224/282, 926; 297/188.01, 188.17, 188.18; 296/37.1, 37.8, 37.9, 37.11, 37.12; 248/311.2

(56) References Cited

U.S. PATENT DOCUMENTS

| | | | |
|---|---|---|---|
| 4,417,764 A | * 11/1983 | Marcus et al. | ......... 297/188.17 |
| 4,568,117 A | 2/1986 | McElfish et al. | |
| 4,955,571 A | * 9/1990 | Lorence et al. | .......... 248/311.2 |
| 5,060,899 A | 10/1991 | Lorence et al. | |
| 5,487,519 A | * 1/1996 | Grabowski | ............... 248/311.2 |
| 5,527,008 A | * 6/1996 | Schutter et al. | ........... 248/311.2 |
| 5,533,772 A | * 7/1996 | Volkers et al. | ............. 296/37.9 |
| 5,692,658 A | * 12/1997 | Fischer et al. | ............... 224/281 |
| 5,749,554 A | * 5/1998 | Avila et al. | ............... 248/311.2 |
| 5,820,094 A | * 10/1998 | Tanaka | ..................... 248/311.2 |

FOREIGN PATENT DOCUMENTS

| | | |
|---|---|---|
| DE | 198 21 313 A1 | 12/1999 |
| FR | 2 747 969 | 10/1997 |
| JP | 07329626 A | 12/1995 |

OTHER PUBLICATIONS

Patent Abstracts of Japan, vol. 018, No. 521 (M–1681), Sep. 30, 1994 & JP 06 179338 A, Jun. 28, 1994.
Patent Abstracts of Japan vol. 1997, No. 03, Maech 31, 1997 & JP 08 300997 A, Nov. 19, 1996.
Patent Abstracts of Japan vol. 018, No. 319 (M–1623), Jun. 17, 1994 & JP 06 072228 A, Mar. 15, 1994.
Patent Abstracts of Japan vol. 018, No. 319 (M–1623), Jun. 17, 1994 & JP 06 072227 A, Mar. 15, 1994.
Patent Abstracts of Japan vol. 018, No. 319 (M–1623), Jun. 17, 1994 & JP 06 072225 A, Mar. 15, 1994.

* cited by examiner

Primary Examiner—Stephen K. Cronin
(74) Attorney, Agent, or Firm—Michael J. Striker

(57) ABSTRACT

The invention relates to a holder (10) for a drinks container, for example a can, a beaker or a cup, which is intended for installation, for example, in a dashboard (12) of a motor vehicle. The invention proposes arranging, for example, a storage compartment (28) in the holder (10), which storage compartment (28) can be extended, for example in the manner of a drawer, when the holder (10) is not being used. The invention has the advantage that the installation space required for the holder (10) is additionally used for accommodating the storage compartment (28).

8 Claims, 6 Drawing Sheets

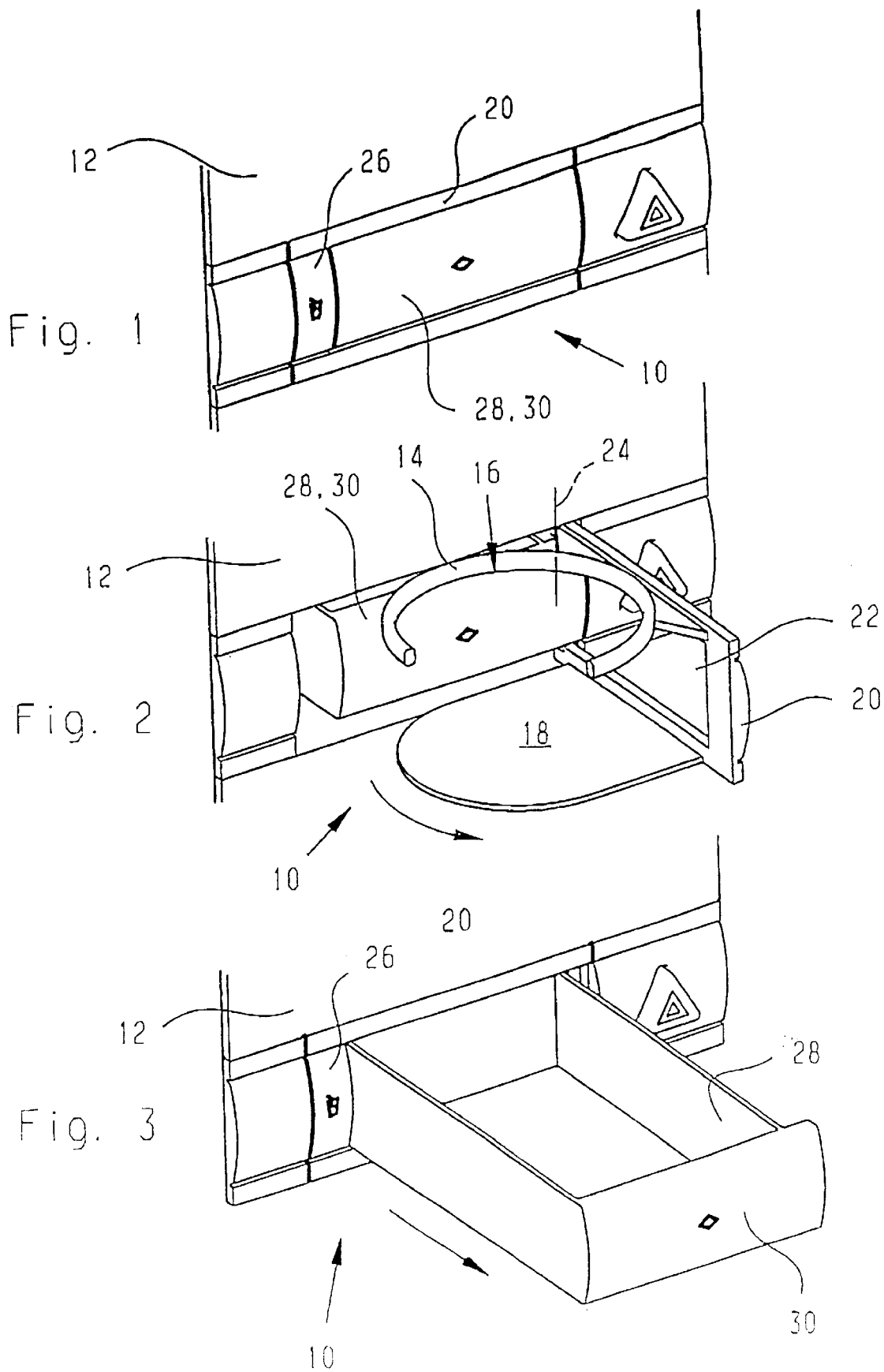

HOLDER FOR A DRINKS CONTAINER

BACKGROUND OF THE INVENTION

The invention relates to a holder for a drinks container, for example a can, a beaker or a cup.

Holders of that kind for installation in motor vehicles are known per se in an enormous multiplicity of constructional forms. The known holders have a holding part, which has an insertion opening for inserting the drinks container, and a supporting part, for example of a planar shape, or even bar-shaped, arranged underneath and spaced apart from the holding part, on which supporting part the drinks container inserted into the insertion opening stands. It is known to provide the holders with a guide means so that they can be extended, pivoted out or pulled out into a use position. When the holder is not needed, it can be moved into a retracted position, for example in a door panel or a dashboard of a motor vehicle. The guide means can be in the form of, for example, a sliding guide means, which guides the holder so that it can be pulled out in the manner of a drawer, or a pivotal mounting, by means of which the holder can be pivoted out from the door panel, the dashboard or the like.

Starting from a holder of the kind described above, the invention is based on the problem of making good use of the installation space required for the holder.

SUMMARY OF THE INVENTION

The problem is solved according to the invention by the features of claim 1. The holder according to the invention has a receptacle, for example a storage compartment or an ash-tray, which is integrated with the holder. 'Integrated' within the context of the invention is understood to mean that, when the receptacle, holding part and supporting part are in the basic position, the receptacle is arranged in the same installation space as that in which the holding part and supporting part are also located. The receptacle is accordingly located between the holding part and the supporting part or, vice-versa, the holding part and supporting part are located within the receptacle. As a result, the same installation space is used for accommodating both the receptacle and also the holding part and supporting part. The installation space required for the holder according to the invention is therefore not larger than, or only slightly larger than, the installation space required for the holding part and supporting part without the receptacle. The invention consequently has the advantage that the otherwise unused installation space for the holding part and supporting part is additionally used for accommodating the receptacle. The holder according to the invention is preferably so constructed that contents placed inside the receptacle do not impede or prevent a drinks container from being inserted into the insertion opening of the holding part and placed on the supporting part. In an embodiment of the invention, the receptacle is arranged at a level between the holding part having the insertion opening for the drinks container and the supporting part for the drinks container.

The holding part and the supporting part of the holder according to the invention are preferably connected to one another; they are especially constructed integrally with one another so that they are always moved together. In principle, a common guide means for the holding part and supporting part is sufficient.

BRIEF DESCRIPTION OF THE DRAWINGS

The invention is described below in greater detail with reference to two exemplary embodiments illustrated in the drawing, in which:

FIGS. 1–3 show, in three different positions, a first constructional form of a holder according to the invention;

DESCRIPTION OF THE PREFERRED EMBODIMENTS

Figure 4:
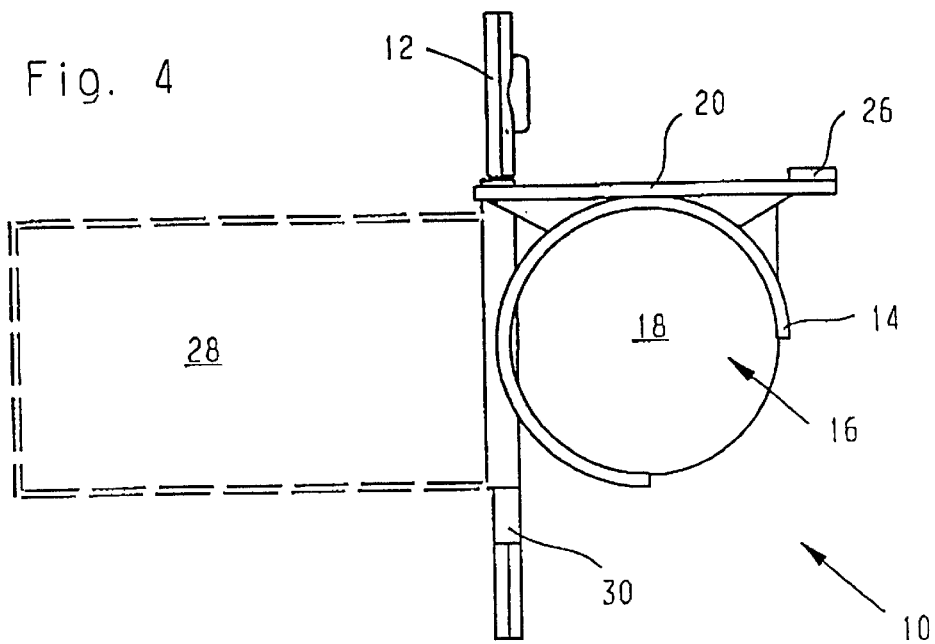
FIGS. 4 and 5 each show a plan view, in diagrammatic and simplified form, of the holder from FIGS. 1–3, the position shown in FIG. 4 corresponding to that in FIG. 2 and the position shown in FIG. 5 corresponding to that in FIG. 3.

The holder 10 according to the invention shown in FIGS. 1–5 is installed, for example, in a dashboard 12 of a motor vehicle (not otherwise shown). The holder 10 is intended for the insertion and holding of a drinks container (not shown), for example a can, a beaker or a cup. In a basic position shown in FIG. 1, the holder 10 is retracted into the dashboard 12 and accommodated therein; it is flush with the surface of the dashboard 12. In FIGS. 2 and 4, the holder 10 has been moved into a use position, wherein it is located in front of the dashboard 12 and can be used for inserting and holding a drinks container. As can be seen from FIGS. 2 and 4, the holder 10 has, as the holding part, a holding ring 14 constructed as part of a circular ring and extending over ¾ of a full circle. The holding ring 14 surrounds an insertion opening 16 for inserting the drinks container (not shown).

Below the holding ring 14, spaced apart therefrom, the holder 10 has a supporting plate 18, which forms a supporting part 18 of the holder 10. The holding ring 14 and the supporting plate 18 are integrally connected to one another by way of a vertical panel 20. The panel 20 is in the form of a rectangular frame having a rectangular opening 22.

The holder 10 has a guide means in the form of a pivotal mounting (not shown in the drawing) having pivot pins, which project upwards and downwards on one side of the panel 20 and which are located in mounting holes in the dashboard 12. The holder 10 is, by means of the pivotal mounting, pivotally guided in the dashboard 12 about a vertical pivot axis 24. The holder 10 pivots, preferably as a result of spring actuation, into the use position shown in FIGS. 2 and 4 and is held in the retracted position in the dashboard 12, shown in FIG. 1, by means of a locking device known per se, for example a so-called push—push mechanism. As a result of gentle pressure on a button 26 (FIG. 1) on a side of the panel 20 remote from the pivot axis 24, the locking device can be unlocked so that the holder 10 pivots out from the dashboard 12 into the use position shown in FIGS. 2 and 4.

Figure 5:
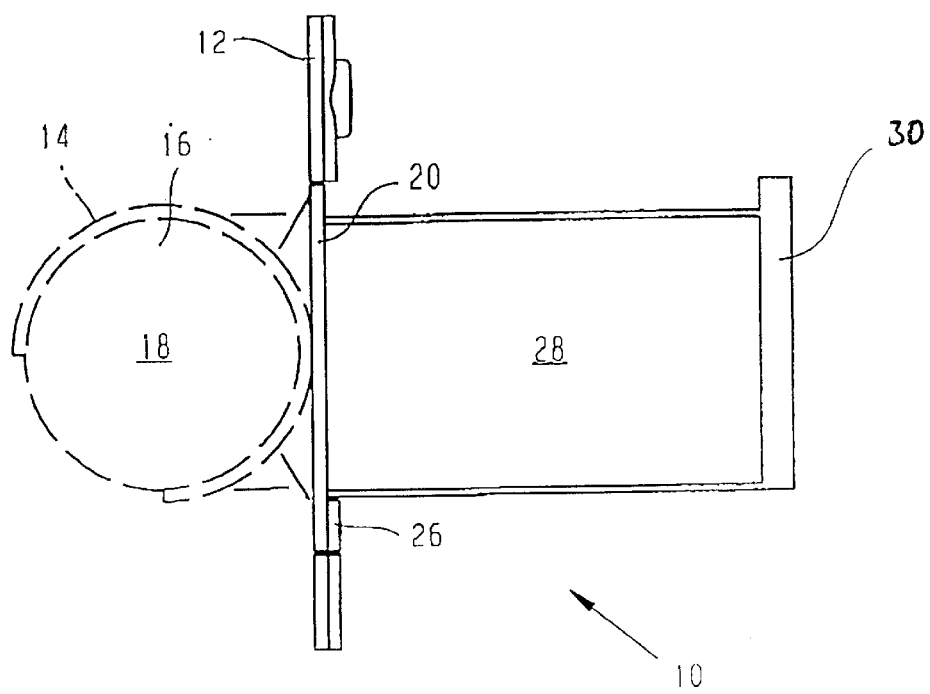

Integrated into the holder 10 according to the invention is a receptacle which, in the exemplary embodiment shown, is a storage compartment 28. In plan view, the storage compartment 28 has an elongate rectangular shape. At its front end face, the storage compartment 28 has a vertical panel 30 of the same size as the opening 22 in the panel 20 of the holder 10. When the storage compartment 28 and the holder 10 are in a basic, retracted position, the panel 30 of the storage compartment 28 and the panel 20 of the holder 10 are located flush one within the other and are flush with the dashboard 12 (FIG. 1). The storage compartment 28 is arranged at a level between the holding ring 14 and the supporting plate 18 of the holder 10. The storage compartment 28 has a sliding guide means (not shown in the drawing); as shown in FIGS. 3 and 5, it can be pulled out or extended in the manner of a drawer. The storage compartment 28 is preferably extended by means of spring actuation; the storage compartment 28 is held in its basic position, retracted into the dashboard 12, by means of a locking device (not shown), for example a push—push mechanism known per se, which can be unlocked by gentle pressure on the panel 30 of the storage compartment 28. The holder 10 and the storage compartment 28, as desired, are capable of being brought into their respective use positions and used, as can be seen in FIGS. 2–5.

In the explanation of the constructional form of a holder 10 according to the invention shown in FIGS. 6–10, corresponding reference numerals are used hereinbelow for components that are the same as in FIGS. 1–5. The holder 10 from FIGS. 6–10 has a storage compartment 28, which is located within the holder 10. The holder 10 and the storage compartment 28 located therein have, in plan view, approximately the shape of a quarter-circle sector. The holder 10 is in the form of a kind of casing that, in plan view, is in the shape of quarter of a circle and the upper face of which forms a holding part 14 and the base of which forms a supporting part 18 of the holder 10. The upper face 14 and the base 18 of the holder 10 are integrally connected to one another by means of a side wall 32 and a front panel 20, as mentioned before, to form a kind of casing. The upper face forming the holding part 14 of the holder 10 has an opening, which at one location extends into the side wall 32. The opening forms an insertion opening 16 for inserting a drinks container (not shown). At one location in the insertion opening 16 there is arranged a compensating flap 34, known per se, which is spring-loaded and which pivots into the insertion opening 14 by means of spring actuation and presses against an inserted drinks container. The compensating flap 34 serves to match the holder 10 to drinks containers of different diameters.

Figure 6:
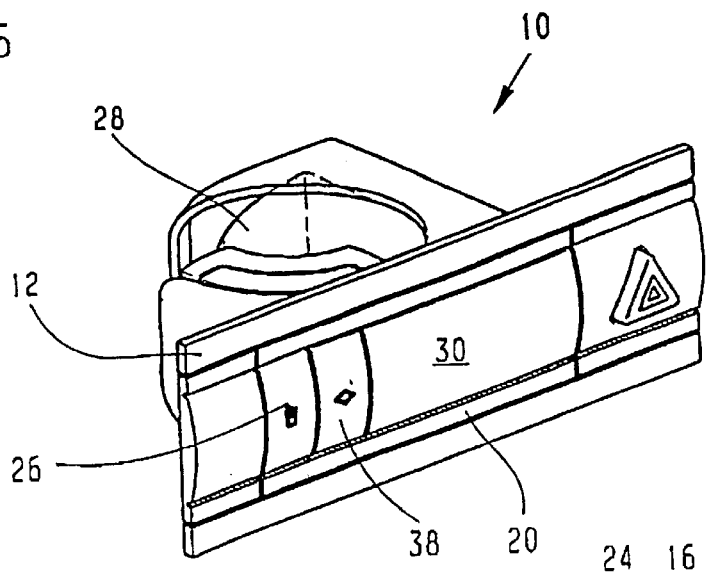
FIGS. 6–8 show, in three different positions, a second constructional form of a holder according to the invention.
Figure 7:
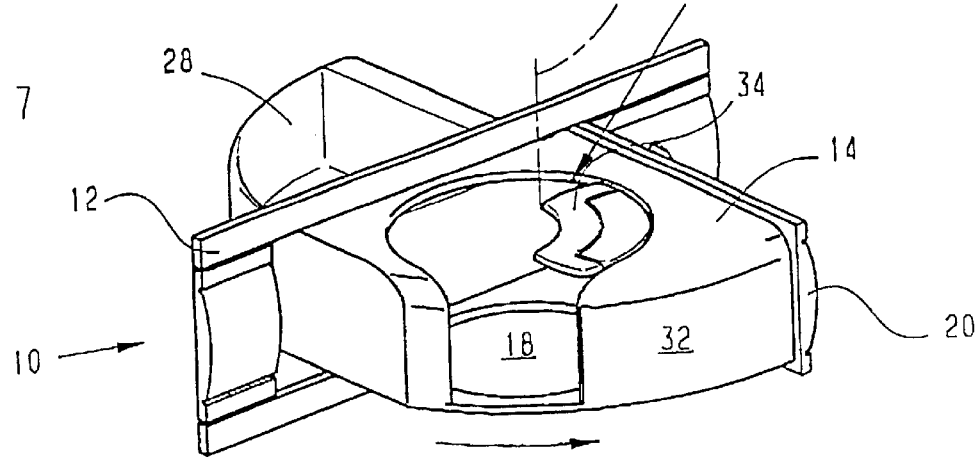
Figure 9:
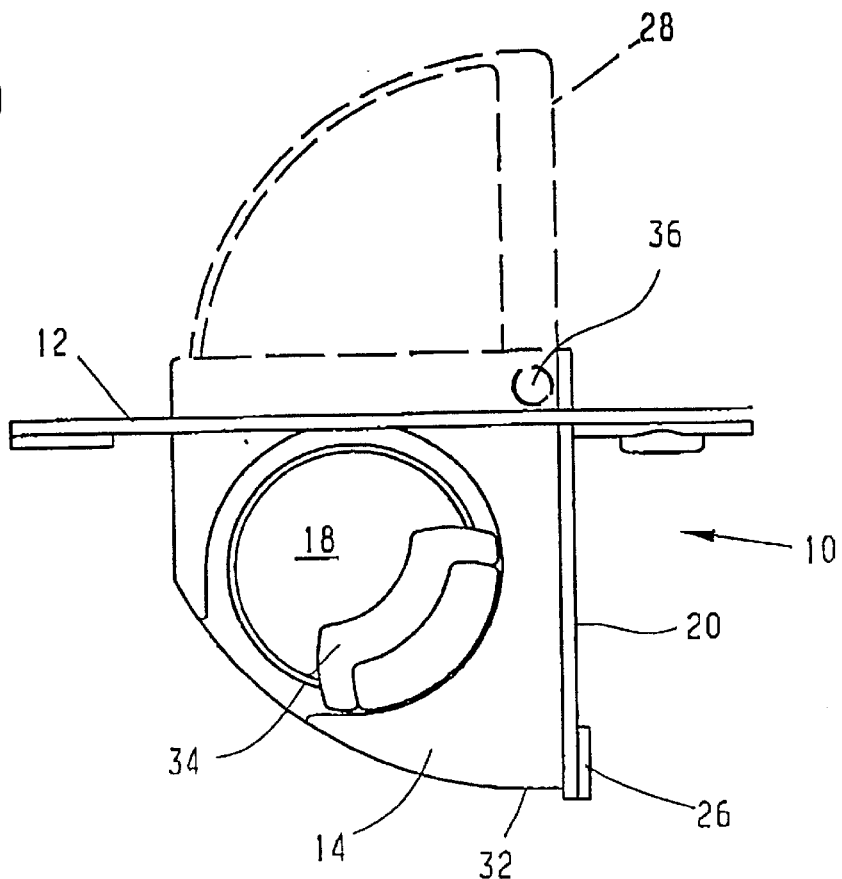
FIGS. 9 and 10 each show a plan view, in diagrammatic and simplified form, of the holder from FIGS. 6–8, the position shown in FIG. 9 corresponding to that in FIG. 7 and the position shown in FIG. 10 corresponding to that in FIG. 8.

The holder 10 has a guide means in the form of a pivotal mounting 36 having pivot pins on the holder 10, which are located in mounting holes in the dashboard 12, by means of which pivotal mounting the holder 10 can be pivoted through 90° from the position retracted into the dashboard 12 and shown in FIG. 6, into the use position projecting out from the dashboard 12 and shown in FIGS. 7 and 9. In the use position, the holder 10 is located in front of the dashboard 12 so that a drinks container (not shown) can be inserted into the insertion opening 16 of the holder 10. The holder 10 preferably pivots into the use position as a result of spring actuation, for example by means of a torsion spring element (not shown). The holder 10 is held in the basic position by a locking device (not shown), for example a push—push mechanism known per se, which can be unlocked by gentle pressure on the unlocking button 26 for the holder 10.

Figure 8:
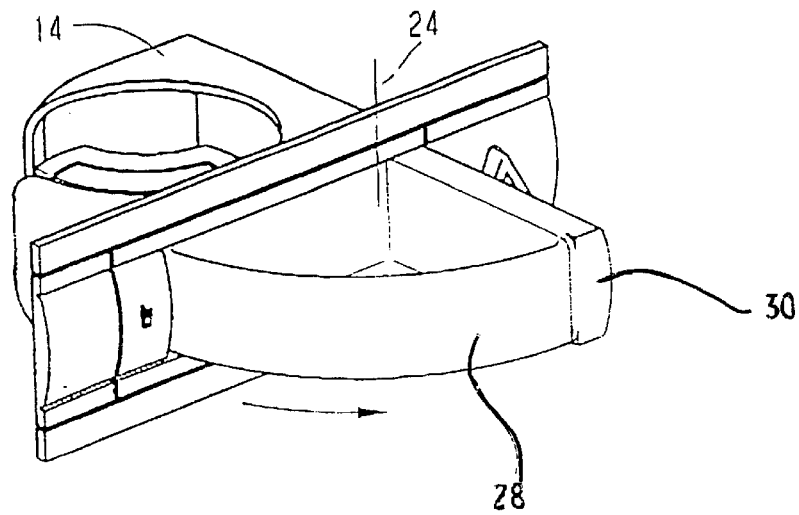
Figure 10:
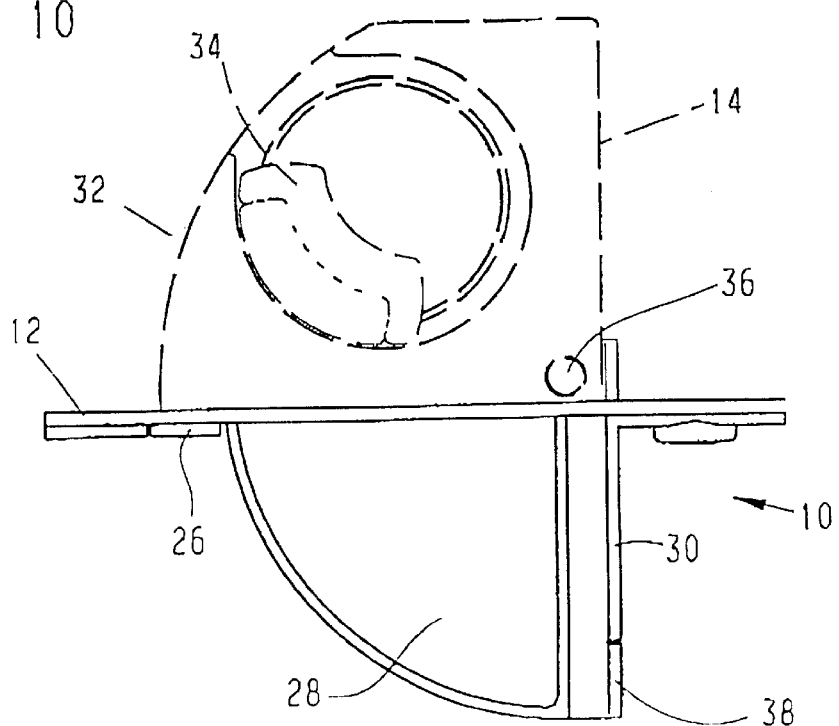
Figure 12:
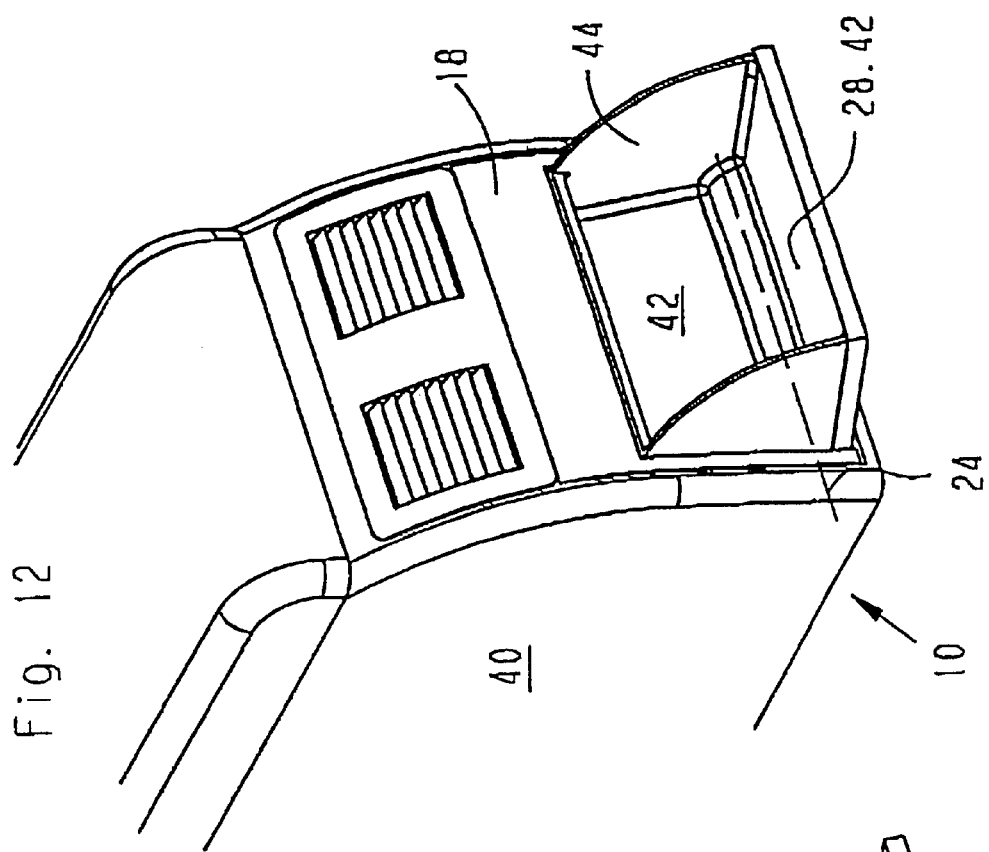
FIGS. 11 and 12 show, in two different positions, a third constructional form of a holder according to the invention.

The panel 20 of the holder 10 has the shape of a rectangular frame having a rectangular opening, in which a panel 30 of the storage compartment 28 is located, lying flush, when the holder 10 and the storage compartment 28 are located in the basic position retracted into the dashboard 12, as shown in FIG. 6. The storage compartment 28 likewise has a guide means in the form of a pivotal mounting (not shown in the drawing), the pivot axis 24 of which coincides with the pivot axis 24 of the holder 10. The storage compartment 28 can be pivoted through 90° about the same pivot axis 24 as the holder 10, from the basic position retracted into the dashboard 12 into the use position projecting out from the dashboard 12, as shown in FIGS. 8 and 10. Pivoting-out is preferably carried out as a result of spring actuation; the storage compartment 28 is held in the retracted, basic position by means of a locking device, for example a push—push mechanism known per se, which can be unlocked by briefly pressing a button 38. In the case of the holder 10 according to the invention shown in FIGS. 6–10, the holder 10 or the storage compartment 28, as desired, can likewise be pivoted out from the dashboard 12 into the use position and used.

In the explanation of the exemplary embodiment of a holder 10 according to the invention shown in FIGS. 11–15, corresponding reference numerals are also used for components that are the same as in FIGS. 1–5 and/or FIGS. 6–10. The holder 10 from FIGS. 11–15 is installed in a rear end of a central console 40, accessible to backseat passengers, in a motor vehicle (not otherwise shown). The holder 10 has a storage compartment 28, which forms a receptacle of the holder 10. The storage compartment 28 has two walls 42 which are arranged at right angles to one another and which abut one another forming a common edge or a chamfer. At the end faces, the walls 42 are connected to one another by end walls 44 in the shape of quarter-circle discs.

The storage compartment 28 can be pivoted about a horizontal pivot axis 24, which extends along the common edge of the two walls 42 of the storage compartment 28. For pivotal mounting, the storage compartment 28 has a pin mounting 36 (FIGS. 13–15) having laterally arranged pins, which define the pivot axis 24. The storage compartment 28 can be pivoted out from a basic position shown in FIGS. 11, 13 and 14 through slightly less than 90° into a use position shown in FIGS. 12 and 15. In the basic position, the storage compartment 28 is retracted into the central console 40 and one of its walls 42 is flush with the central console 40. In the use position, the storage compartment 28 projects out from the rear end of the central console 40 and is open so that objects can be taken out or inserted.

Figure 13:
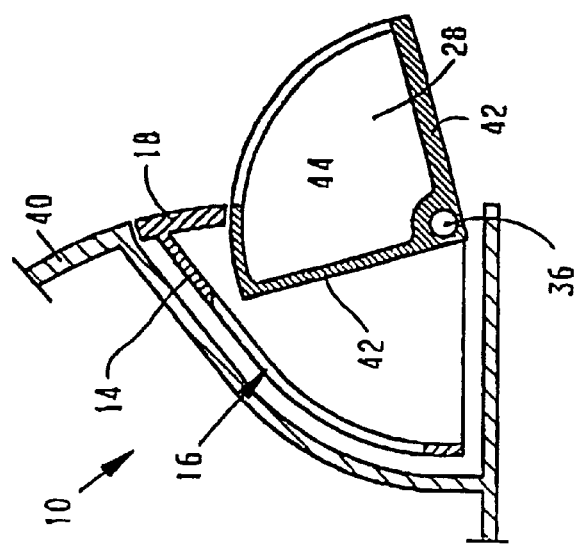
FIGS. 13–15 each show a sectional view, in diagrammatic and simplified form, of the holder from FIGS. 11 and 12, the position shown in FIG. 14 corresponding to that in FIG. 11 and the position shown in FIG. 15 corresponding to that in FIG. 12, and FIG. 13 showing a further position of the holder.

The storage compartment 28 is located in a holding part 14 and a supporting part 18 integral therewith. The holding part 14 and the supporting part 18 together form a body which, in side view, has approximately the shape of a quarter-circle sector and in which the storage compartment 28 is located. The holding part 14 and the supporting part 18 can be pivoted through about 90° about the pivot axis 24 by means of the pin mounting 36. The pin mounting 36 and the pivot axis 24 are common to the storage compartment 28 and the holding part 14 together with the supporting part 18. In a basic position shown in FIGS. 12, 13 and 15, the holding part 14 is retracted into the central console 40 and the supporting part 18 is flush with the rear end of the central console 40. When the storage compartment 28 is also in the basic position, the supporting part 18 is also flush with one wall 42 of the storage compartment 28 (FIG. 13). In the use position shown in FIGS. 11 and 14, the holding part 14 and the supporting part 18 project out from the rear end of the central console 40; in the use position, the supporting part 18 assumes an approximately horizontal orientation.

Figure 11:
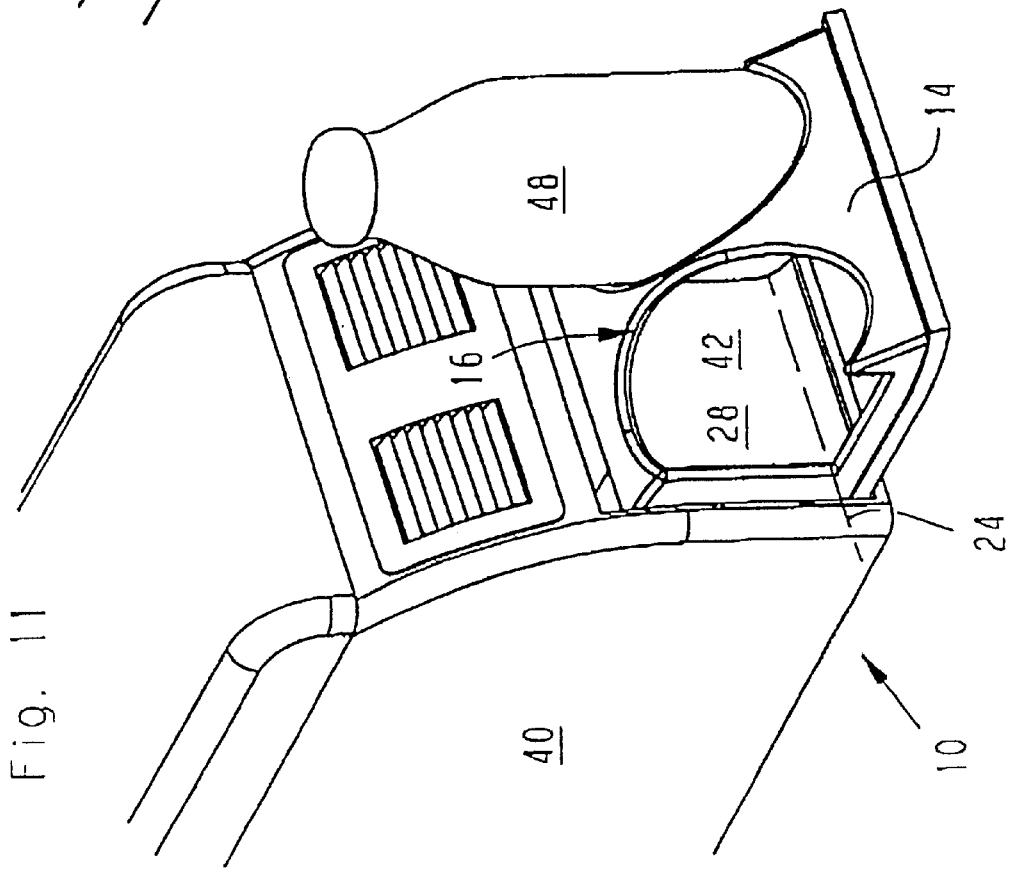
Figure 14:
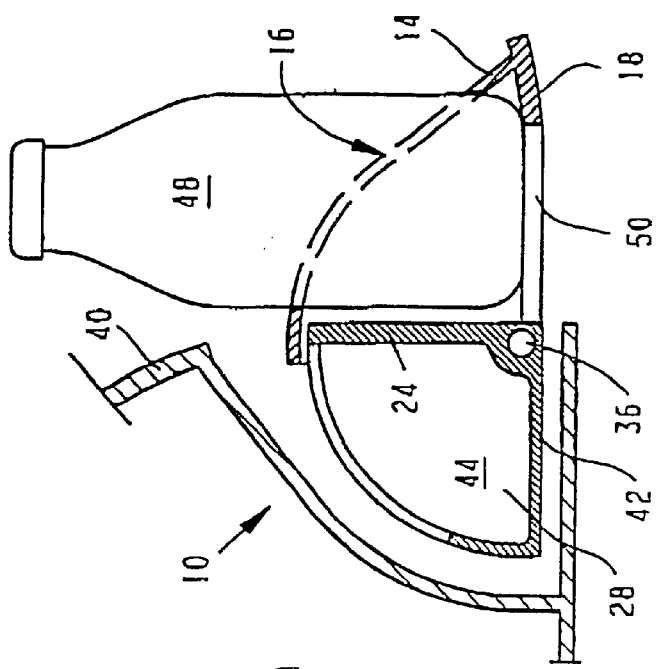
Figure 15:
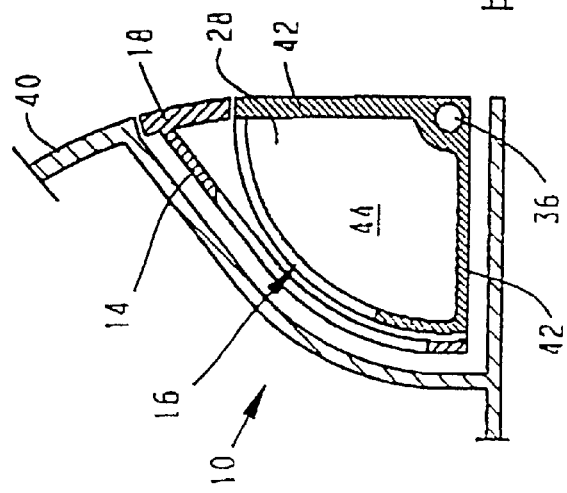

The holding part 14 is provided with two circular openings arranged next to one another, which form the insertion openings 16 for inserting drinks containers, for example the bottle 48 shown in FIGS. 11 and 14. The drinks container stands on the supporting part 18.

The supporting part 18 has a rectangular cut-out 50, the shape and size of which corresponds to one wall 42 of the storage compartment 28. When the storage compartment 28 and the holding part 14 together with the supporting part 18 are located in the basic position retracted into the central console 40, the wall 42 of the storage compartment 28 is located within cut-out 50 in the supporting part 18 and is flush with the supporting part 18. The storage compartment 28 and the holding part 14 together with the supporting part 18 can be pivoted into the use position and the basic position independently of one another. Articles located in the storage compartment 28 do not impede the insertion of a drinks container into the insertion openings 16 of the holding part 14 when the storage compartment 28 is in the basic position, as shown in FIGS. 11 and 14.

What is claimed is:

1. Holder for a drinks container, having a holding part provided with an insertion opening for inserting the drinks container and having a supporting part arranged below the holding part, spaced apart therefrom, onto which supporting part the drinks container is arranged to be placed, the holding part and supporting part having a guide means by which they are movably guided from a retracted, basic position into an extended, use position, wherein a receptacle (28) is integrated into the holder (10), which receptacle (28) has a guide means by which it is movably guided from a retracted, basic position into an extended, use position independently of the holding part (14) and supporting part (18), and wherein the receptacle (28) is arranged at a level between the holder (14) and the supporting part (18).

2. Holder according to claim 1, wherein when the holding part (14), supporting part (18) and receptacle (28) are in the basic position, the receptacles (28) is arranged within the holding part (14) and supporting part (18).

3. Holder according to claim 1, wherein the holding part (14) and the supporting part (18) have a pivotal mounting as the guide means.

4. Holder according to claim 1, wherein the receptacle (28) has a sliding guide means.

5. Holder according to claim 1, wherein the receptacle (28) has a pivotal mounting as the guide means.

6. Holder according to claim 1, wherein the receptacle (28) is a storage compartment or an ash-tray.

7. Holder according to claim 1, wherein the holding part (14) and the supporting part (18) am connected to one another.

8. Holder according to claim 7, wherein the holding part (14) is integral with the supporting part (18).

* * * * *